United States Patent [19]

Smith et al.

[11] 4,218,137
[45] Aug. 19, 1980

[54] ISOLATING MEMBER FOR USE IN CONTACT PRINTING

[75] Inventors: David S. Smith, Pittsford; Leroy F. Cooley, Rochester, both of N.Y.

[73] Assignee: Eastman Kodak Company, Rochester, N.Y.

[21] Appl. No.: 52,361

[22] Filed: Jun. 27, 1979

[51] Int. Cl.² .................................. G03B 27/20
[52] U.S. Cl. .................................. 355/92; 355/99; 355/118
[58] Field of Search ............... 355/89, 90, 92, 95, 355/96, 97, 99, 102, 118, 91, 19

[56] References Cited

U.S. PATENT DOCUMENTS

| 725,969 | 4/1903 | Jaray | 355/92 |
|---|---|---|---|
| 759,469 | 5/1904 | Rachel | 355/92 |
| 2,718,181 | 9/1955 | Gullixson et al. | 355/92 |
| 3,320,867 | 5/1967 | Miller | 355/92 |
| 3,409,364 | 11/1968 | Moorhusen | 355/92 |
| 3,510,217 | 5/1970 | Cirimele et al. | 355/92 X |
| 3,547,537 | 12/1970 | Betron | 355/92 |
| 3,689,154 | 9/1972 | Swain et al. | 355/97 |
| 4,029,404 | 6/1977 | Mizukami et al. | 355/91 |
| 4,087,181 | 5/1978 | Alexander et al. | 355/92 |

*Primary Examiner*—Richard A. Wintercorn
*Attorney, Agent, or Firm*—Donald W. Strickland

[57] ABSTRACT

Apparatus and method are disclosed for use in contact printing information from a master record carrier onto a replicate material of a type that emits a gas during the contact print exposure (e.g., a diazo film emulsion). Even though the master record carrier and the replicate material are pressed together by a pressure pad (e.g., a rubber diaphragm), it has been discovered that the emitted gas causes the master and replicate devices to separate slightly and that strain forces in the pressure pad are transmitted to the replicate material causing relative movement of the master record carrier and the replicate material during the contact print exposure. To limit such relative movement, a preferred embodiment of the present invention provides an isolating member disposed between the master-replicate sandwich and the pressure pad. The isolating member, because of certain physical characteristics discussed in detail below, prevents strain forces in the pressure pad from being transmitted to the replicate material.

14 Claims, 14 Drawing Figures

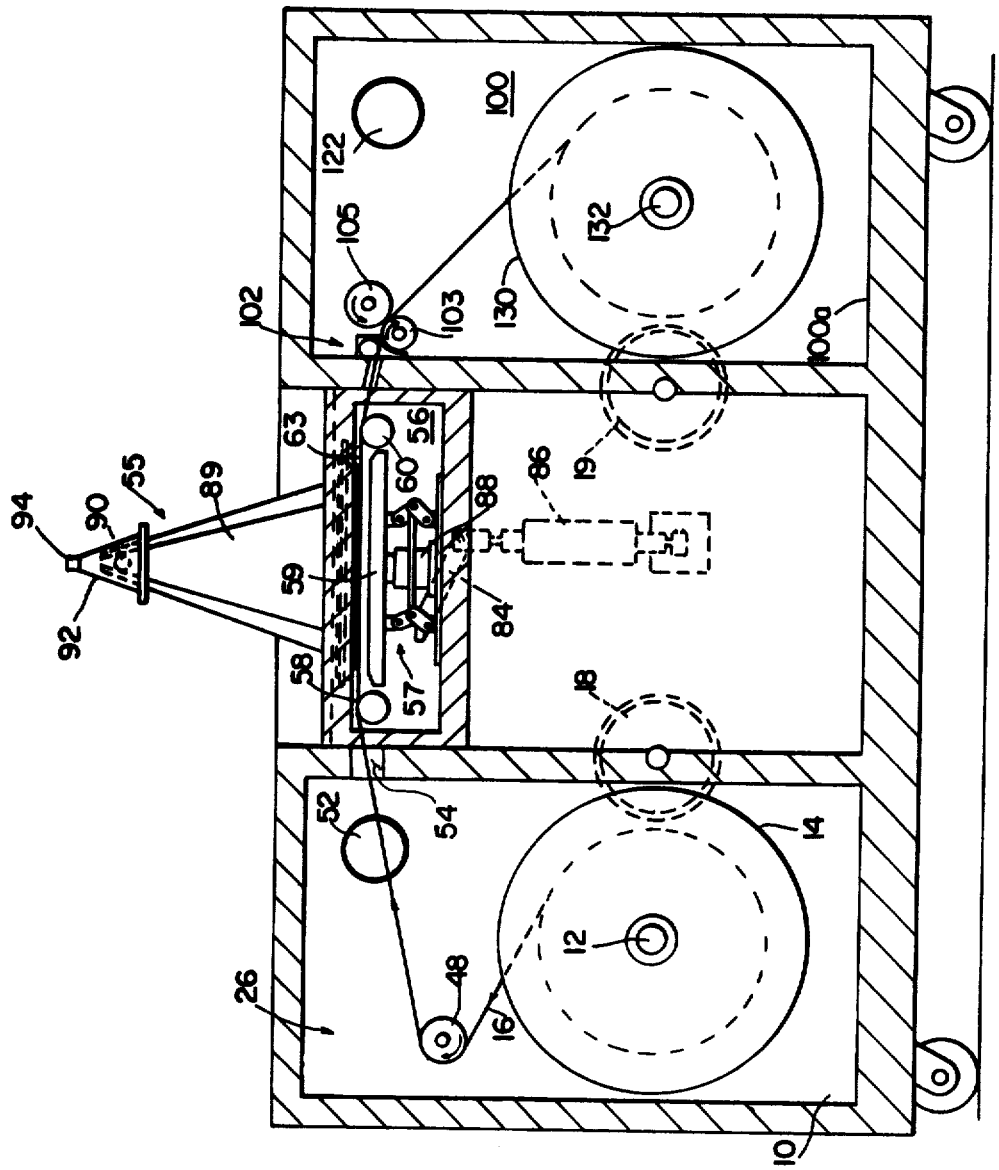
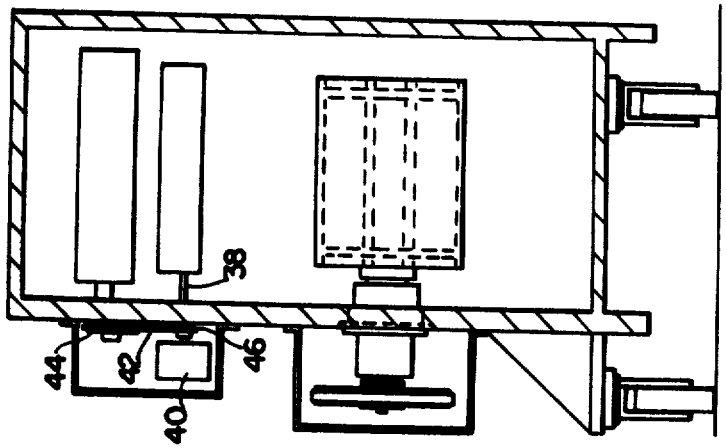
FIG. 1
FIG. 2

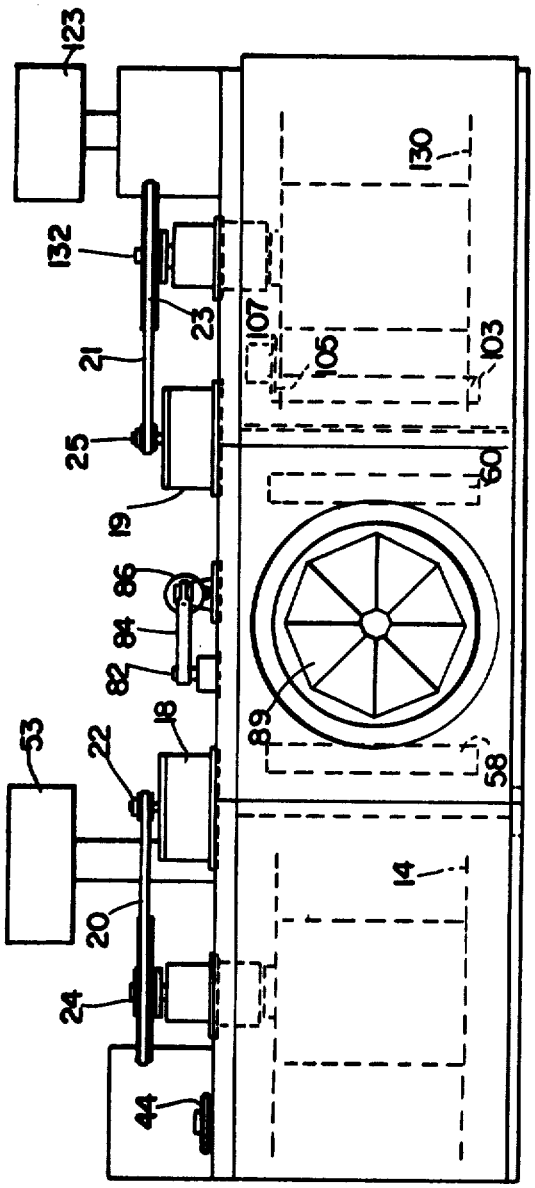
FIG. 3
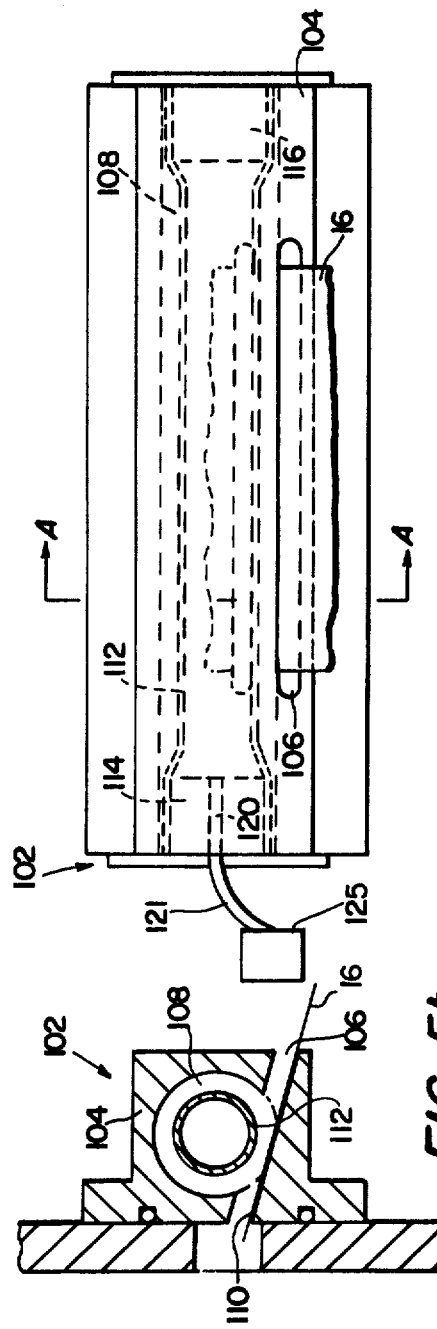
FIG. 5a
FIG. 5b

ISOLATING MEMBER FOR USE IN CONTACT PRINTING

BACKGROUND OF THE INVENTION

The present invention relates to apparatus and method for contact printing information from a master record carrier onto a replicate material and, more particularly, to such apparatus and method for limiting relative movement of a master record carrier and the replicate material during the contact print exposure.

DESCRIPTION RELATIVE TO THE PRIOR ART

The replication process used to produce replicate videodiscs from a master is important in determining the commercial feasibility of mass produced videodiscs. Of all the videodisc replication processes (compression molding, embossing, injection molding, etc.), optical contact printing is, potentially, the most useful. To replicate by contact printing, all that is necessary is that the master and replicate material is brought into contact, a contact print exposure made, and the replicate material processed in a conventional manner. Optical contact printing has not yet found widespread application as a replication process for videodiscs, however, because of the extremely high spatial frequencies involved in video recording, and because of the large area over which video information is recorded.

Typically, a standard videodisc is 30 cm in diameter and contains billions of discrete, micron-sized apertures.

In an attempt to contact print replicate such a videodisc onto a diazo replicate material, apparatus was constructed wherein a pressure pad in the form of an inflatable rubber diaphragm was used to press the master record carrier and diazo replicate material into close contact. The contact print exposure was made using a high intensity xenon flashlamp. The resultant replicate videodisc, when played back on a video monitor, produced an unstable picture that had a low signal-to-noise ratio and that was devoid of high frequency information. Microscopic examination of the replicated imagery revealed that the apertures, which were well-defined and generally circular or elliptical in shape on the master, had been distorted during the "replication" process into ill-defined, tadpole shaped images with tails, or streaks, many times the length of the original image. Moreover, the tails were generally, although not uniformly, disposed toward the center of the replicated videodisc. The cause of this unusual type of distortion was unknown.

Careful consideration of the problem and further experimentation led to the discovery that relative movement of the master and replicate material during the contact print exposure caused the observed distortion. The cause of such movement was determined to be the result of several interactive factors: Initially, an inflated rubber diaphragm presses the master and replicate material into close contact. During the contact print exposure, however, the diazo replicate material emits nitrogen gas, the pressure of which counteracts the applied force pressing the master and replica together, thereby causing the master and replicate material to separate. Even though the amount of released gas is small, and the separation is thus only slight, the nitrogen gas acts as an efficient lubricant of the mater-replicate interface. While not completely understood, it is believed that the lubricated master-replicate interface permits tensional and compressional forces in the rubber diaphragm to cause the replicate material to stretch and/or shrink, thereby giving rise to a major portion of the observed distortion pattern.

SUMMARY OF THE INVENTION

In accordance with the present invention, apparatus is provided especially useful in contact printing information from a master record carrier onto a replicate material that emits gas during the contact print exposure, e.g., a diazo replicate material. In a preferred embodiment, means are provided for bringing the replicate material and the master record carrier into contact to form a master-replicate sandwich. An isolating material is flexible to conform to the contour of the master-replicate sandwich, yet still to isolate the master-replicate sandwich from tensional and compressional forces from the contacting means.

BRIEF DESCRIPTION OF THE DRAWINGS

In the detailed description of the preferred embodiments of the invention presented below, reference is made to the accompanying drawings, in which:

FIGS. 1, 2 and 3 are front, side and top sectional views respectively of a videodisc replication machine;

FIGS. 5a and 5b are detail drawings of a seal-port device used in the replication machine of FIGS. 1, 2 and 3, FIG. 5b being a section view along line A—A of FIG. 5a;

DESCRIPTION OF THE PREFERRED EMBODIMENTS

Figure 4A:
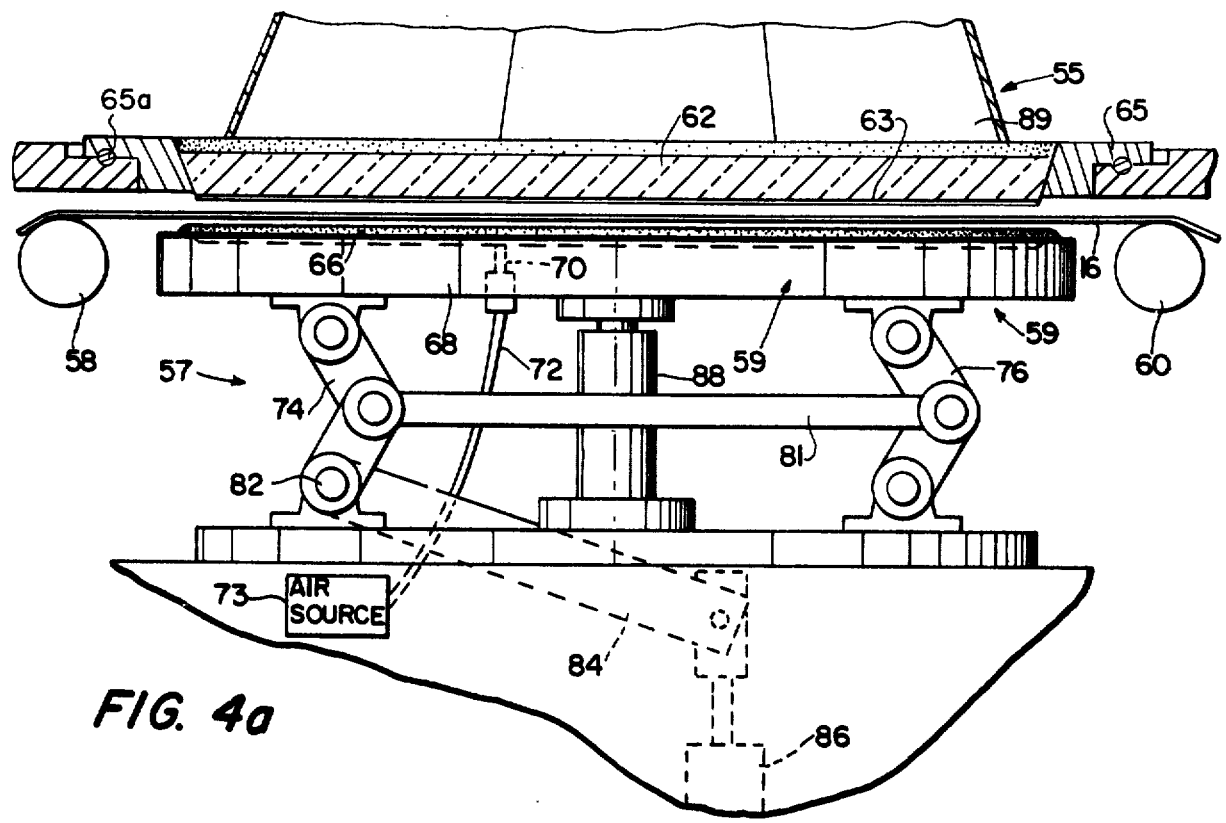
FIGS. 4a and 4b are detail drawings partly in section showing certain aspects of an exposure station in the replication machine of FIGS. 1, 2 and 3.

The present invention relates to improved apparatus for use in contact printing information from a master record carrier onto a replicate material. It will be understood that the term "contact printing" as used throughout the specification and claims includes that type of replication which is sometimes referred to as "proximity contact printing" wherein a master record carrier and a replicate material are brought into close proximity for a contact print exposure. References to the effect that two surfaces are brought into contact are to be construed, therefore, as including the case where the surfaces are brought into close proximity.

A videodisc replication machine is shown in FIGS. 1, 2, 3, 4a, 4b, 5a and 5. The replication machine is described in detail in U.S. patent application Ser. No. 52,532, filed on even date herewith in the name of David S. Smith, and hereby incorporated by reference. Since in one embodiment, the present invention takes the form of improvements to the replication machine, the basic replication machine will be briefly described. It will be apparent to those skilled in the art, however, that the present invention has utility in the general field of contact printing. By way of overview, the replication machine shown in the drawings generally includes three major sections: (1) a supply chamber wherein the replicate material is degassed and its photosensitive surface cleaned of foreign particles, (2) an exposure station including an exposure chamber (which can be evacuated) containing a pressure platen or other means for bringing the replicate material and the master record carrier into close contact for the contact print exposure, and (3) a takeup chamber for storing exposed replicate material, the takeup chamber being separated from the exposure chamber by a sealport device which, when activated, permits the takeup chamber to be brought up to atmospheric pressure without substantially affecting the vacuum condition in the exposure chamber.

Referring to FIG. 1, an airtight supply chamber 10 contains a spindle 12 for receiving a supply real 14 of a replicate material 16. The spindle 12 is driven by a torque motor 18 through a belt 20 and pulley 22, 24 arrangement as shown in FIG. 3. The replicate material 16 passes over a guide roller 48 and enters an exposure station through a port 54.

Referring to FIG. 1, the exposure station comprises three main components: (1) a source of radiation 55, (2) an exposure chamber 56 and (3) a pressure platen device 57. The replicate material 16 enters the exposure chamber 56 through the port 54 and is guided over the pressure platen device 57 by a pair of guide rollers 58, 60. The exposure chamber 56 is in fluid communication with the supply chamber 10, via port 54, and is thus maintained at a vacuum level approximately equal to that in the chamber 10. The pressure platen device 57 shown in FIGS. 1, 4a and 4b has a resilient pressure pad assembly 59 which is generally disc shaped, having a diameter of about 35 cm. This configuration matches a master record carrier 63 laminated on a glass support disc 62. The support disc 62 is glued to a metal mounting ring 65 to securely hold the disc 62 in place. An "O" ring 65a provides a seal between the mounting ring 65 and the machine frame.

Figure 4B:
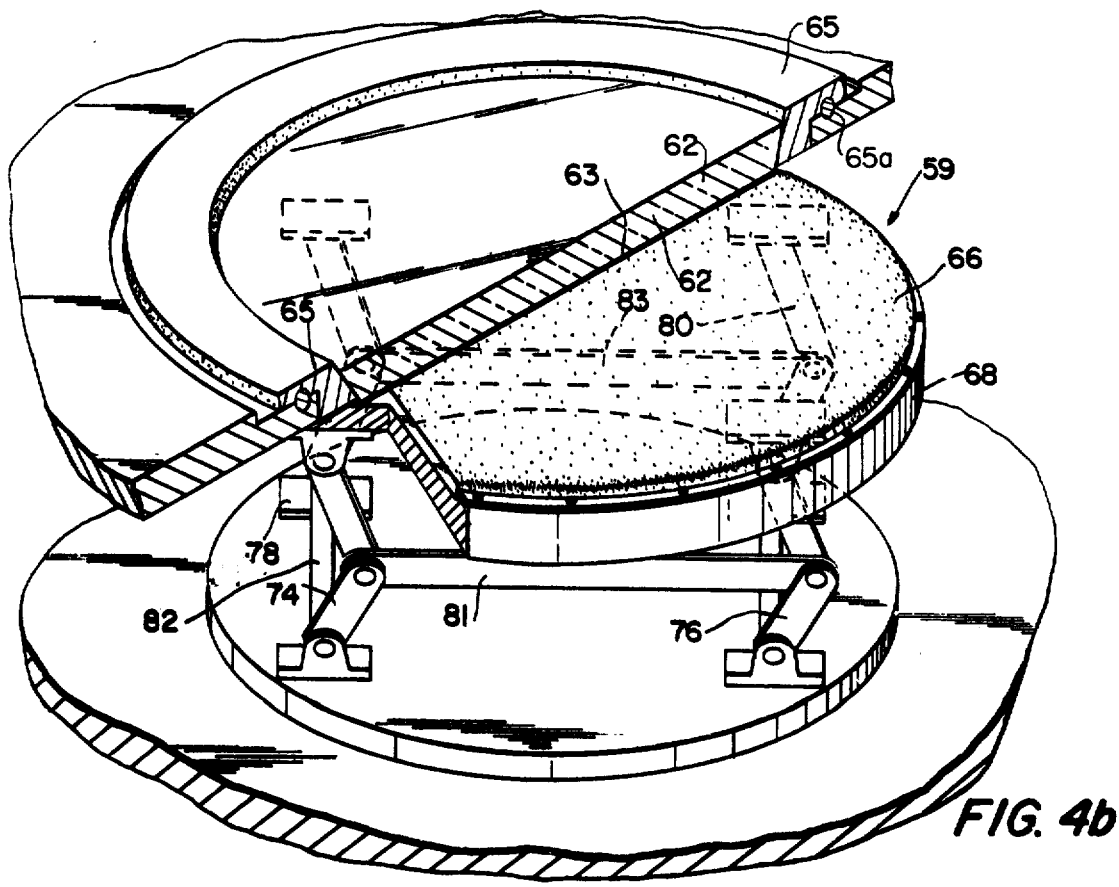

The pressure pad assembly 59 is shown most clearly in FIGS. 4a and 4b. The pressure pad assembly 59 has a fabric-reinforced rubber diaphragm 66 clamped at the edge to a disc-shaped plate 68. The disc-shaped plate 68 has a port 70 which is connected via supply hose 72 to an external air source 73. A linkage mechanism comprised of four link arrangements 74, 76, 78 and 80, joined by a pair of crosslinks 81 and 83, supports the pressure pad assembly 59. The linkage mechanism is actuated by rotation of a drive shaft 82 by means of a drive arm 84 connected to an air cylinder assembly 86. As shown most clearly in FIG. 2, the air cylinder assembly 86 and the drive arm 84 are external to and mounted on the housing of the replication machine. In response to actuation of the air cylinder assembly 86, rotation of the drive shaft 82 causes the four link arrangements 74, 76, 78 and 80 to drive the pressure pad assembly 59 toward the master record carrier 63. Linear movement of the pressure pad assembly 59 is ensured by the cooperation of a linear guide device 88 with the linkage arrangement. The linkage arrangement drives the pressure pad assembly 59 to touch the underside of the replication material 16 and to press it almost against, or in light contact with, the master record carrier 63. The rubber diaphragm 66 is then inflated to press the photosensitive surface of the replicate material 16 into close contact with the information bearing surface of the master record carrier 63. The vacuum condition maintained in the exposure chamber 56 facilitates such contact.

A source of radiation 55 is then flashed to expose the replicate material 16 through the master record carrier 63 with actinic radiation. The particular radiation source 55 shown in FIGS. 1, 3 and 4a is the subject of U.S. patent application Ser. No. 914,105, filed June 9, 1978 in the name of William F. Garbe, and hereby incorporated by reference. Briefly, referring to FIG. 1, the radiation source 55 includes a reflector 89 comprised of a pyramidal arrangement of generally planar reflective surfaces formed, for example, from sheet aluminum. A source such as xenon flash lamp 90 is disposed within the reflector 80 and positioned so that the reflective surfaces form a spherical array of virtual images of the source. It has been found that such a radiation source satisfactorily exposes the standard, 30 cm diameter master videodisc. Other sources of radiation are also useful with the disclosed replication machine as long as they adequately illuminate, with actinic radiation, the particular master record carrier that is to be replicated.

After the contact print exposure has been made, the rubber diaphragm 66 is deflated and the air cylinder 86 is actuated to lower the pressure pad 59 to its original position. The exposed replicate material 16 is then advanced into a takeup chamber 100.

The takeup chamber 100 is isolated from the exposure chamber 56 by a sealport device 102. Referring to FIGS. 5a and 5b, the sealport device 102 is comprised of a housing 104 having a passage 106 through which the replicate material 16 passes. A cylindrical hole 108 is bored through the length of the housing tangent to the lower surface 110 of the passage 106. A length of rubber tubing 112 is stretched inside the hole 108 and is fastened at both ends to cylindrical plugs 114, 116. The rubber tubing 112, in its uninflated state, is smaller in diameter than the hole 108 by about twice the passage 106 height so that the web of replicate material 16 does not touch the rubber tubing 112. The cylindrical plug 114 has an air port 120 through which air under pressure flows from an air tube 121 connected to an air source 125 to inflate the rubber tubing 112. The inflated rubber tubing 112 fills the hole 108 and presses the replicate material 16 against the lower surface 110 of the passage 106 with sufficient force and over a sufficient area to effectively seal the takeup chamber 100 from the exposure chamber 56, thereby providing vacuum isolation of the two chambers.

The purpose of the sealport device 102 is two-fold. First, it is often desired to open the takeup chamber 100 in order to monitor the quality of the replicated video information. To do this, a section of the exposed replicate material is removed from the takeup chamber 100, processed and examined. Absent the sealport device 102, opening of the takeup chamber 100 would cause the vacuum in the exposure and supply chambers 56 and 10 respectively to be lost. In addition, the replicate material 16 would absorb moisture from the air. As a result, when the takeup chamber 100 is closed it would then be necessary to re-evacuate the supply, exposure and takeup chambers 10, 56 and 100. Because of the relatively large volumes involved, and because of outgassing, the re-evacuation would consume considerable time, e.g., about 30 minutes or so, depending upon the capacity of the pumping system. The sealport device 102 permits the takeup chamber 100 to be isolated from the exposure chamber 56 (and thus the supply chamber 10). The takeup chamber 100 can thus be opened, replicate material 16 removed, and the takeup chamber closed without substantially affecting the vacuum condition in the remainder of the replication machine. Before the sealport device 102 is opened, the takeup chamber 100 is re-evacuated through a vacuum port 122 connected to a vacuum pump 123 (see FIG. 3).

The second purpose of the sealport device 102 is to prevent foreign particles which enter the takeup chamber 100 during repressurization from contaminating other sections of the replication machine. By evacuating the takeup chamber 100 before opening the sealport device 102, any foreign particles which have entered the takeup chamber 100 are removed or fall to the chamber floor 100a. Foreign particles in the takeup chamber 100 are not nearly so undesirable as in the supply or exposure chambers, however, because the contact print exposure has already been made, and subsequent processing is generally not critically sensitive to foreign particles.

In normal operation, the tubing 112 is uninflated to allow advancement of the replicate material 16 through the sealport device 102. When it is desired to open the takeup chamber 100 without affecting the remainder of the replication machine, the rubber tubing 112 is inflated and presses the replicate material 16 against the lower surface 110 of the passageway 106 to form a vacuum seal.

Upon passing through the sealport device 102, the replicate material 16 passes over a roller 103. A wheel 105 contacts the roller 103 and is rotated thereby. The wheel 105 is used to drive a web footage indicator 107 (FIG. 3) to allow accurate positioning of an exposure on the replicate material 16.

The replicate material 16 is wound onto a reel 130 mounted on a takeup reel spindle 132. A torque motor 19 drives the spindle 132 via a belt 21 and pulley 23, 25 arrangement as shown in FIG. 3. To advance the replicate material 16 from the supply reel 14 to the takeup reel 130, the torques of the supply and takeup spindle drive motors 18 and 19 are adjusted to produce a net positive torque on the takeup spindle 132, so as to accelerate the takeup spindle 132 and takeup reel 130 while maintaining web tension constant. The web tension and the torque of the supply spindle motor 18 together accelerate the supply reel 14. To stop advancement of the replicate material 16 while maintaining web tension at the same level, the torque of the supply spindle drive motor 18 is increased to decelerate the supply reel 14, and the torque of the takeup motor 19 is decreased.

Figure 6:
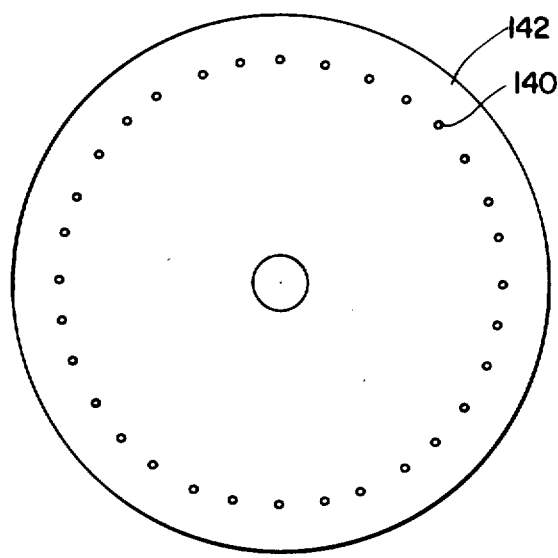
FIG. 6 shows a master record carrier wherein the size of the images has been greatly exaggerated.
Figure 7:
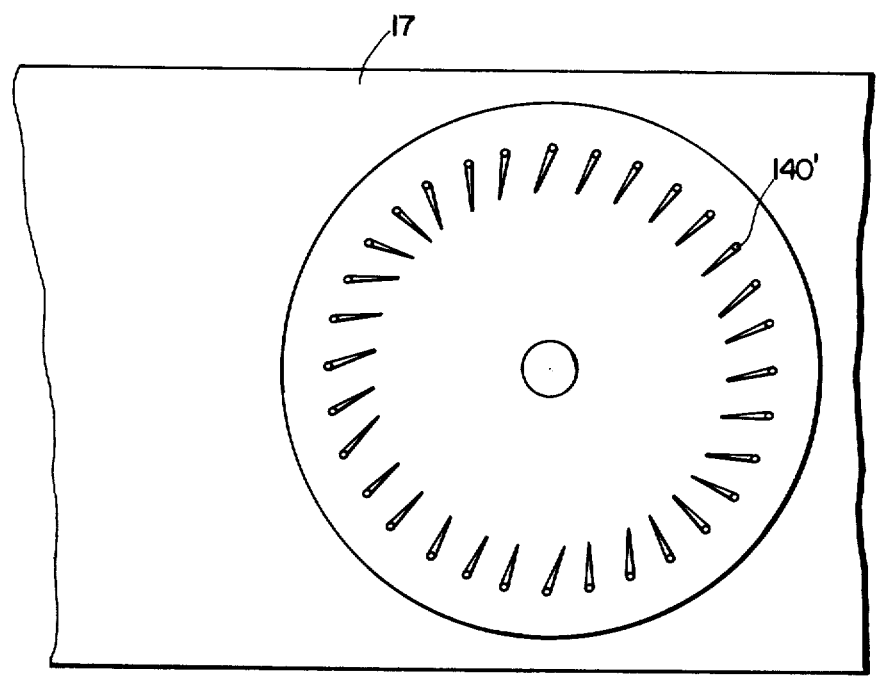
FIG. 7 qualitatively shows the result of contact printing the master record carrier of FIG. 6 onto a diazo replicate material.

The described replication machine produces satisfactory results when used with a variety of replicate materials. Upon using a diazo replicate material, however, a distortion pattern was observed in the replicated image. FIG. 6 shows an image array in the form of micron-sized apertures 140 on an original master record carrier 142. The apertures 140 are greatly exaggerated in size and only one ring of such apertures is shown. (Were the master record carrier 142 a video recording, for example, the record carrier 142 would be covered with billions of such micron-sized apertures.) FIG. 7 shows the result of using the described replication machine to contact print the information on the master record carrier 142 onto a diazo replicate material 17 in web form. The replicate material 17 has an ESTAR (polyethylene terephthalate) support. As can be seen, a peculiar distortion pattern has appeared which has been found to be repeatable from print-to-print.

It has been discovered that the distortion pattern is caused by relative movement of the master record carrier 142 and the diazo replicate material 17 during the contact print exposure. Such relative movement is not a simple sliding since the streaks do not extend in the same direction. Based upon the streak pattern, the relative movement is much more complicated, apparently involving both a radial component of movement and at least two non-colinear components. Moreover, the density of a replicated aperture 140' is not uniform. Each replicated aperture appears to be comprised of a generally circular image (corresponding to the original image on the master) having a streak, or tail, extending therefrom of greater density (assuming transparent apertures in the master and a positive diazo film system).

Although the reason is not completely understood, the observed distortion is greatly reduced by placing an isolating member between the rubber diaphragm 66 and the replicate material 17. Applicant's present understanding of this phenomenon is best explained with reference to FIGS. 8, 9 and 10.

Figure 8:
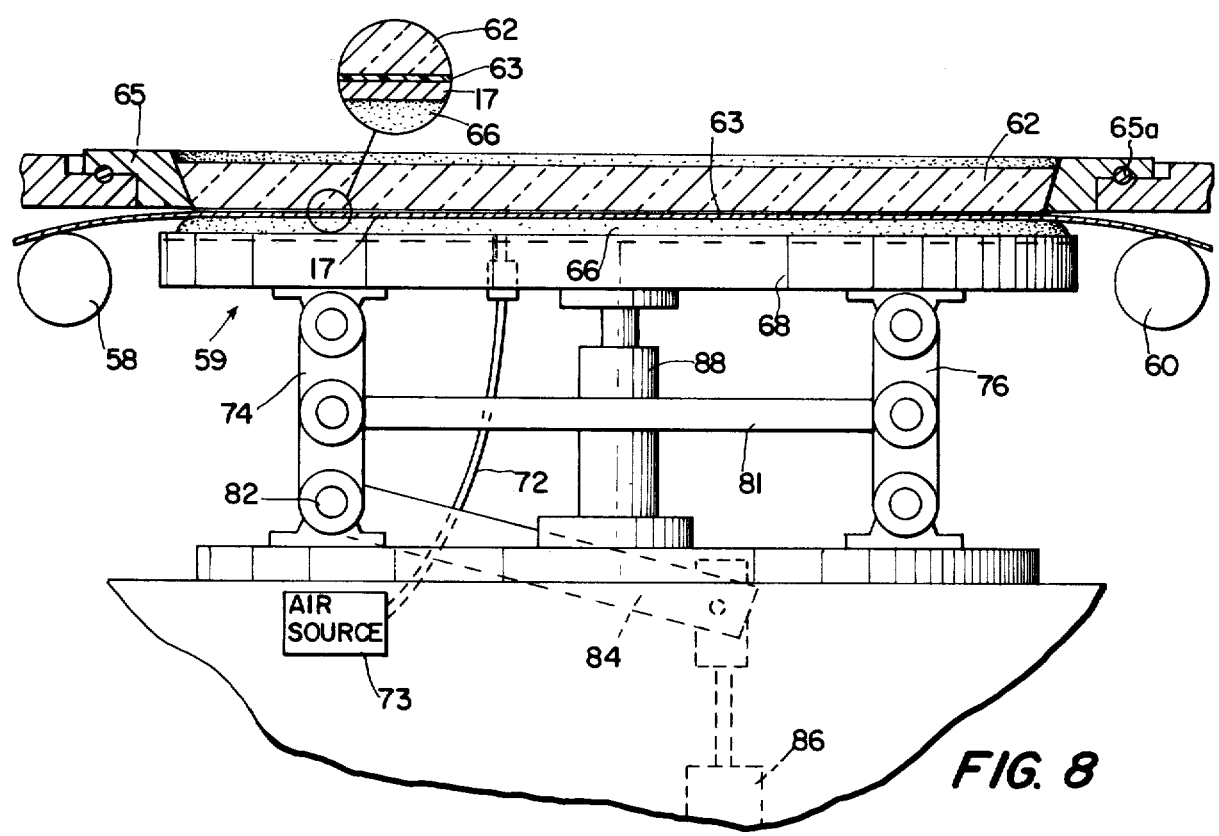
FIGS. 8, 9 and 10 are illustrations useful in describing one embodiment of the present invention.
Figure 9:
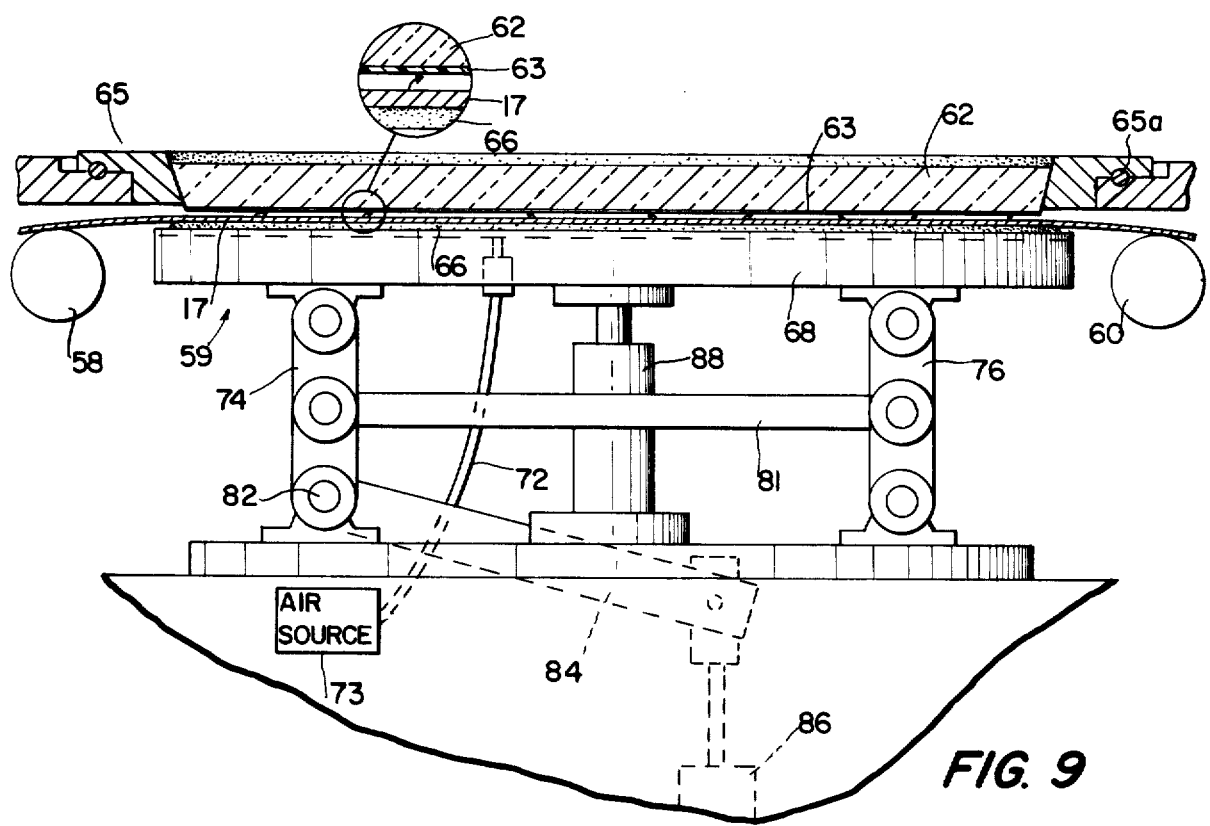
Figure 10:
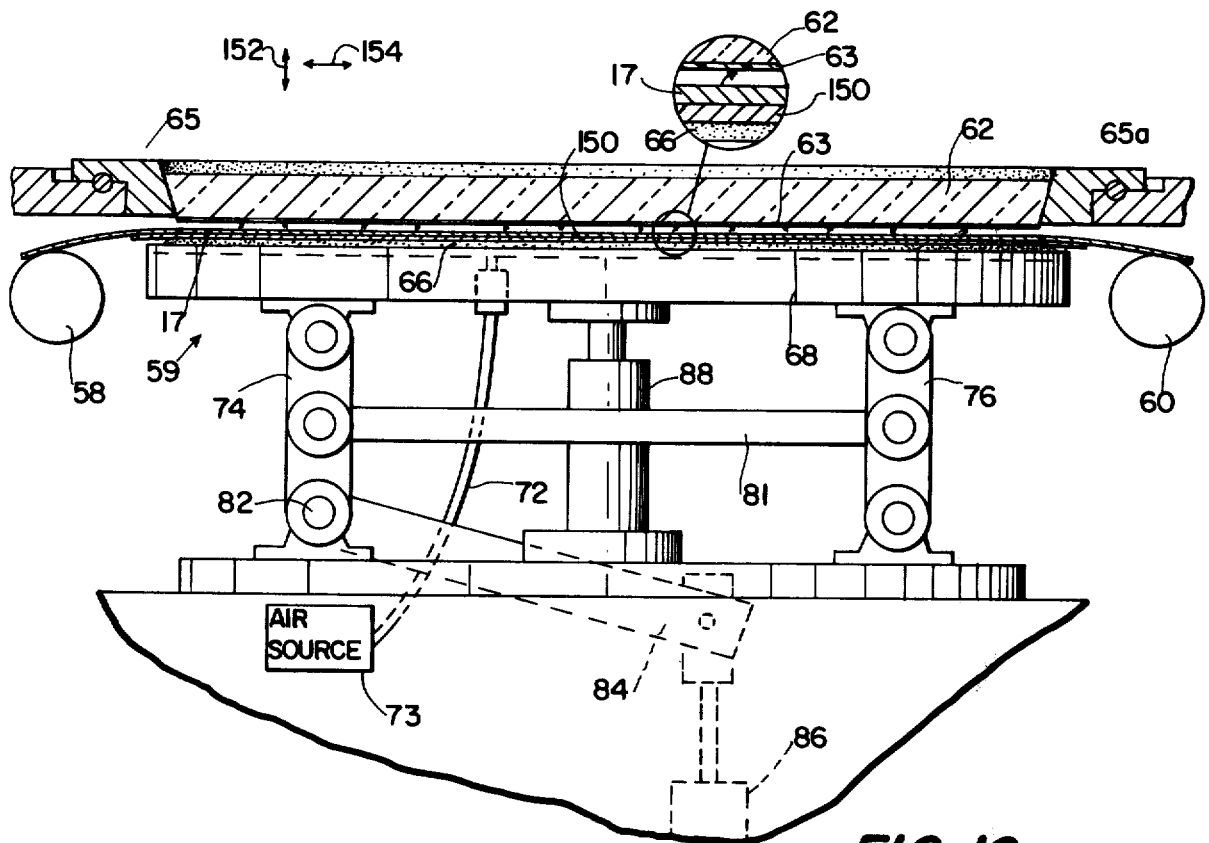

The contact printing process begins by bringing a master record carrier 63 into close contact with a diazo replicate material 17, as shown in FIG. 8. The diazo replicate material 17 is comprised of a support material (e.g., polyethylene terephthalate) and a diazo emulsion. The diazo emulsion contains a diazonium salt that is highly absorbtive to actinic radiation, usually in the 400 nm range. See, for example, Glafkides, Photographic Chemistry (1960), Vol. 2, at 715–726. Upon exposure to actinic radiation, nitrogen gas is formed. The diazo replicate material 17, therefore, emits nitrogen gas during the contact print exposure. The released nitrogen gas forces the master record carrier 63 and the replicate material 17 to separate slightly as shown in FIG. 9. Even though this separation is slight, the nitrogen gas forms an air bearing that acts as an efficient lubricant of the master-replicate interface.

Two sources are believed to be responsible for causing relative movement of the master record carrier 63 and the replicate material 17. First, tensional forces and compressional forces in the rubber diaphragm 66 are believed to be transmitted to the replicate material 17 and cause it to stretch (tensional force) or shrink (compressional force) relative to the master record carrier 63. Since the rubber diaphragm is disc-shaped, the tensional and compressional forces tend to be radially disposed, thereby accounting, to the best of Applicant's knowledge, for the major part of the radial component of relative movement between the master record carrier 63 and the replicate material 17. This effect would not occur when a replicate material that does not emit gas during the contact print exposure is used because the master record carrier and the replicate material are tightly pressed together and remain so during the contact print exposure. As a result, tensional or compressional forces transmitted from the diaphragm to the replicate material have little, if any, effect because frictional engagement of the master record carrier and the replicate material inhibit its stretching or shrinking. Further, the tensional or compressional forces are transmitted through the replicate material to the master record carrier, so both the master record carrier and the replicate material stretch or shrink together.

According to Applicant's present understanding, the second source of relative movement between the master record carrier 63 and the replicate material 17 is relative thermal expansion of the replicate material 17 and the master record carrier 63. Such thermal expansion occurs during the contact print exposure as the master and replicate material absorb thermal energy from the exposing source of radiant energy. It is believed that the anisotropic nature of the ESTAR (polyethylene terephthalate) support (due to biaxial crystal structure) of the replicate material 17 causes nonuniform thermal expansion and gives rise to a major portion of the nonradial components of relative movement. Other support materials, such as cellulose acetate, may exhibit different thermal expansion properties and thus produce a different distortion pattern.

In accordance with the present invention, to prevent relative movement of the master record carrier 63 and the replicate material 17 caused by strain forces in the rubber diaphragm 66, an isolating member 150 (see FIG. 10) is disposed between the rubber diaphragm 66 and the master-replicate sandwich. The isolating member 150 is flexible in the direction of arrow 152, yet stiff (resists stretch and shrinkage due to applied strain forces) in the direction of arrow 54. Being flexible, the isolating member 150 conforms to the contour of the master-replicate sandwich during the contact printing process, thereby producing uniform contact of the master and replicate devices.

Because it is stiff, the isolating member 150 isolates the replicate material 17 from tensional and compressional forces in the rubber diaphragm 66. Absent the isolating member 150, it is believed that these forces in the rubber diaphragm 66 would be transmitted to the replicate material 17 causing it to stretch or shrink. Use of the isolating member 150, therefore, eliminates, or greatly reduces, the effect of this source of relative movement between the master record carrier 63 and the replicate material 17.

The stiffness of the isolating member 150 required for a particular application depends upon a combination of several factors: (1) the amount of relative movement that can be tolerated between the master record carrier and the replicate, (2) the rigidity of the replicate material itself (a more rigid material resists stretch and shrinkage), (3) the amount of frictional engagement between the isolating member 150 and the rubber diaphragm 66, and (4) the amount of frictional engagement between the isolating member 150 and the replicate material 17.

It is believed that, at least under certain conditions, the use of an isolating member as taught by the present invention also inhibits relative movement of the master record carrier and the replicate material due to relative thermal expansion. Since the master record carrier 63 is laminated to a glass disc 62, it undergoes little thermal expansion. And since during the contact print exposure the isolating member 150 is pressed into contact with the replicate material 17, frictional engagement of the replicate material 17 and the isolating member 130 also inhibits thermal expansion of the replicate material 17.

As an example of a specific material suitable for use as the isolating member 150, a sheet of brass having a modulus of elasticity of $10.3 \times 10^{10}$ newtons per square meter and a thickness of 0.025 cm was cut to a circle 30 cm in diameter and attached to the rubber diaphragm 66 with a piece of double sided tape. This isolating member satisfactorily isolated the diazo replicate material from tensional and compressional forces in the rubber diaphragm 66.

A similar result can be achieved by an isolating member comprised of other materials as well, each material having a thickness inversely dependent upon the materials' modulus of elasticity. A material having a higher modulus of elasticity will thus permit the use of a thinner isolation member for a given stiffness. Use of a thin isolating member is advantageous because a thinner isolating member will have a better ability to conform to local thickness variations of the master-replicate sandwich. For example, the bass sheet material described above, with a modulus of elasticity of $10.3 \times 10^{10}$ newtons per square meter and a thickness of 0.025 cm, may be replaced by a stainless steel sheet about 0.014 cm in thickness having a modulus of elasticity of $19.3 \times 10^{10}$ newtons per square meter, or a sheet of beryllium 0.009 cm in thickness having a modulus of elasticity of $29 \times 10^{10}$ newtons per square meter. Relative to the brass isolating member, the stainless steel isolating member, because it is thinner, will have greater flexibility by a factor of about 3.5, and the beryllium will have a greater flexibility by a factor of about 7.8. It will be apparent to those of ordinary skill in the art that other materials may be used for the isolating member.

Figure 11A:
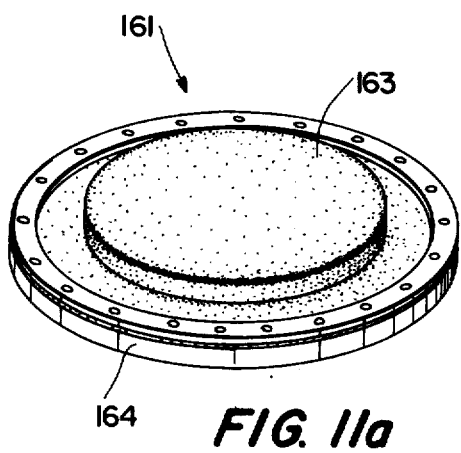
FIGS. 11a and 11b are illustrations useful in describing a second embodiment of the present invention.
Figure 11B:
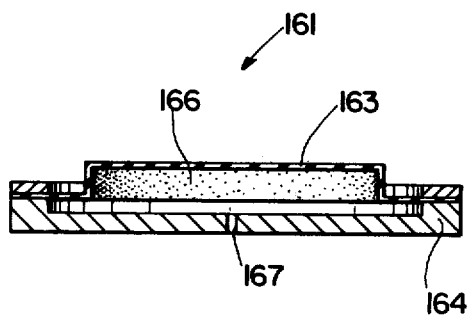

An alternate embodiment of the invention obviates the necessity for a separate isolating member and pressure pad. Referring to FIGS. 11a and 11b, a pressure platen 161 includes a sheet 163 of material having the physical properties of the isolating member 150. The pressure platen 161 can be incorporated into the above described replication machine as a replacement for the pressure pad 59. The sheet 163 is fastened at the periphery of a disc-shaped platen 164 shaped to provide a fluid chamber 166. Upon the introduction of fluid into the chamber 166 through a port 167, the sheet 163 is urged outwardly to press the master record carrier and the replicate material into close and uniform contact. Because the sheet is flexible it conforms to the contour of the master-replicate sandwich thereby ensuring close and uniform contact. Because the sheet is stiff, there are only insubstantial amounts of tensional and compressional forces transmitted to the replicate material. The invention has been described in detail with particular reference to preferred embodiments thereof, but it will be understood that variations and modifications can be effected within the spirit and scope of the invention.

What is claimed is:

1. In apparatus for use in contact printing information from a master record carrier onto a replicate material wherein said apparatus includes means for bringing the master record carrier and the replicate material into contact, the improvement comprising:

an isolating member resistant to stretch and compression disposed so as to be sandwiched between said contacting means and the contacted master record carrier and replicate material, thereby substantially isolating the contacted master record carrier and replicate material from strain forces from said contacting means.

2. In apparatus for use in contact printing information from a master record carrier onto a replicate material that emits gas during a contact print exposure, wherein said apparatus includes a resilient pressure pad for pressing together the master record carrier and the replicate material to form a master-replicate sandwhich, the improvement comprising:

an isolating member arranged so as to be interposed between the resilient pressure pad and the master-replicate sandwich, said isolating member being flexible to conform generally to the contour of the master-replicate sandwich and stiff to isolate the master-replicate sandwich from tensional and compressional forces from the resilient pressure pad.

3. Apparatus as claimed in claim 2 wherein said isolating member is comprised of a thin sheet of metal.

4. Apparatus as claimed in claim 2 wherein said isolating member is comprised of a sheet of brass about 0.025 cm in thickness.

5. In apparatus for use in contacting printing information from a master record carrier onto a replicate material that emits gas during a contact print exposure, wherein said apparatus includes means for bringing the master record carrier and the replicate material into contact to form a master-replicate sandwich, the improvement wherein,
said contacting means is flexible to conform to the contour of the master-replicate sandwich, yet resistant to stretch and shrinkage so that tensional and compressional forces are not transmitted to the master replicate sandwich.

6. Apparatus as claimed in claim 5 wherein said contacting means is comprised of a thin sheet of metal.

7. Apparatus for use in contact printing information from a master record carrier onto a diazo replicate material, said apparatus comprising:
means for pressing the replicate material and the master record carrier into contact to form a master-replicate sandwich; and
an isolating member disposed so as to be sandwiched between said pressing means and the master-replicate sandwich during the contacting process, said isolating member being flexible to conform to the contour of the master-replicate sandwich while isolating the master-replicate sandwich from tensional and compressional forces in said pressing means.

8. Apparatus for use in contact printing information from a master record carrier onto a diazo replicate material, said apparatus comprising:
contacting means acting upon either or both of the master record carrier and the replicate material for forming a master-replicate sandwich; and
an isolating member disposed between either or both of the master record carrier and the replicate material acted upon by said contacting means, said isolating member being flexible to conform to the contour of the master-replicate sandwich isolating the master-replicate sandwich from tensional and compressional forces from said contacting means.

9. Apparatus for use in contact printing information from a master record carrier onto a diazo replicate material, said apparatus comprising means for pressing the replicate material and the master record carrier into mutual contact, said pressing means including an isolating member which is flexible but is not susceptible to stretch or shrinkage due to tensional or compressional forces applied thereto.

10. Apparatus for use in contact printing video information from a master record carrier onto a superposed diazo replicate material, said apparatus comprising:
a resilient pressure pad comprised of an inflatable rubber diaphragm;
means for positioning said pressure pad in close proximity to said superposed diazo replicate material and master record carrier;
means for inflating said rubber diaphragm to bring the diazo replicate material and the master record carrier into contact;
an isolating member disposed so as to be interposed between said pressure pad and said master-replicate sandwich, said isolating member being flexible to conform to the contour of the master-replicate sandwich and resistant to stretch and shrinkage to isolate the master-replicate sandwich from tensional and compressional forces in the inflated rubber diaphragm.

11. Apparatus as claimed in claim 10 wherein said isolating member is comprised of a thin sheet of metal.

12. A method of bringing a replicate material and a master record carrier into contact to form a master-replicate sandwhich comprising the step of applying pressure to either the replicate material or master record carrier through an intermediate contact member which is flexible enough to conform generally to the master-replicate sandwich and which is resistant to stretch and shrinkage to prevent tensional and compressional forces from being transmitted to the master-replicate sandwich.

13. Photographic apparatus for replicating information from a master record carrier onto a replicate material, comprising:
means for pressing the replicate material into surface contact with the master record carrier, said pressing means having a surface for engaging the replicate material which is dimensionally stable throughout the range of pressures required for achieving said surface contact; and
means for exposing replicate material through the master record carrier with actinic radiation while in such surface contact.

14. In photographic replication apparatus having a flexible resilient member for pressing replicate material into surface contact with a master record carrier during exposure with actinic radiation, the improvement comprising:
spacer means interposed between said member and said material for imparting to the material forces tending to induce such surface contact while insulating said material from any distortion producing forces present on the surface of said member during said exposure.

* * * * *